Patented June 1, 1954

2,680,097

UNITED STATES PATENT OFFICE 2,680,097

PREPARATION OF PHENATES

William T. Stewart, El Cerrito, Calif., assignor to California Research Corporation, San Francisco, Calif., a corporation of Delaware No Drawing. Application June 24, 1953,
Serial No. 363,933

25 Claims. (Cl. 252—42.7)

This invention is directed to a new and improved method of preparing calcium and lead salts of phenols; and more particularly pertains to the use of certain dihydric alcohols as the reaction media in the preparation of calcium and lead salts of phenols.

This patent application is a continuation-in-part of co-pending applications Serial No. 114,071, filed September 3, 1949 (which is a continuation-in-part of my application Serial No. 37,049, filed July 3, 1948, now abandoned) and Serial No. 296,261, filed June 28, 1952

Calcium salts of phenols are used as detergents for dispersing sludges and maintaining internal combustion engines clean. Lubricating oils have been compounded with such calcium salt detergents and they have been used successfully for a number of years in diesel engines and automotive engine service in general. It has recently been found (as fully described in Rollins, Lowe, and Furby patent application Serial No. 203,221) that oil-soluble lead salts of phenols are especially desirable for imparting detergency to aviation lubricating oils since they do so without promoting preignition which is a serious problem in aircraft operation.

In the preparation of calcium and lead salts of phenols, it has heretofore been customary to use time-consuming and material-consuming two-step processes, or one-step processes involving the use of high temperatures. In the two-step process, alkali metal phenates are first prepared by reacting phenols with alkali metal hydroxides. The resulting alkali metal phenates are then reacted with calcium or lead inorganic salts, or calcium or lead salts of low molecular weight fatty acids to form the corresponding phenates. For example, in the preparation of a calcium phenate, a sodium phenate is first prepared by neutralizing a phenol with a solution of sodium hydroxide, and the sodium phenate thus formed is then reacted with calcium chloride, for example, to form a calcium phenate. The yields of calcium and lead phenates are extremely low when the phenates are prepared by such processes, the two-step process requiring more time and greater expenditures of chemicals than is necessary with the process disclosed in the present invention.

As an improvement over the above two-step process, a one-step process has been used. However, in that process it has been essential to use high reaction temperatures (i. e., about 500° F.), and as a result, the phenates have a dark color, necessitating further purifications to obtain light colored products. Furthermore, such processes use expensive chemicals and evolve explosive gases.

Certain polyvalent metal oxides and the hydroxides react with phenols in monohydric alcohols sufficiently to obtain fair yields of the reaction products. For example, in the preparation of barium phenates, a phenol is reacted with barium hydroxide octahydrate in an alcohol (e. g., ethyl alcohol) reaction medium. The reactants are sufficiently soluble in the ethyl alcohol to promote the reaction to a greater degree than is possible where only a dispersion of the reactant is present.

However, such is not the case when using an oxide or hydroxide of calcium or lead since these bases are unique in phenol neutralization reactions. When an oxide or a hydroxide of calcium or lead is reacted with a phenol in a monohydric alcohol reaction medium (e. g., ethyl alcohol), the yields of the calcium and lead salts are very low.

Also, attempts have been made to promote the reaction of polyvalent metal oxides and hydroxides with phenols by the use of two solvents, the solvents being such that the reactants are soluble in separate solvents; not in both solvents. For example, in the preparation of a calcium phenate, the phenol reactant has been dissolved in an organic solvent, and the calcium reactant (e. g., calcium oxide) has been dissolved in water. However, this method is also unsatisfactory because of the low yields obtained.

Thus, it is the object of this invention to provide a new method of preparing calcium and lead salts of phenols, which method involves a one-step reaction and which avoids the disadvantages of heretofore used methods.

According to the present invention, it has been discovered that calcium and lead phenates can be prepared in good and improved yields and of high purity by using as the reaction medium lower molecular weight dihydric alcohols, i. e., alkane vicinal diols of up to 6 carbon atoms. The calcium and lead phenates are prepared by a one-step process wherein phenols are reacted with calcium and lead base substances (i. e., the oxides and hydroxides of calcium and lead) in the presence of a dihydric alcohol.

A number of advantages accrue from the use of the process of the present invention in the formation of calcium and lead phenates. By carrying out the reaction of phenols with calcium and lead basic substances in a dihydric alcohol medium, superior yields of calcium and lead salts of phenol are obtained. Thus, as contrasted to the low conversions of calcium and lead bases when using other reaction media, the present process gives high conversions in one step. Further, because relatively mild reaction conditions can be employed, the phenates of high purity, uncontaminated with deleterious, dark-colored side-reactions or decomposition products, can be obtained.

Although it is not intended to set forth any theory or reaction mechanism involving the use of the lower molecular weight alkane vicinal diols according to the present invention, calcium and lead compounds thereof are believed to be formed when the calcium or lead base substances are added to the alkane vicinal diol reaction medium, which compounds then react with the phenol to form the desired salts.

Examples of suitable alkane vicinal diols having less than 6 carbon atoms are ethane diol-1,2 (i. e., ethylene glycol), propane diol-1,2; propane diol-2,3; butane diol-2,3; butane diol-1,2; pentane diol-1,2; pentane diol-2,3; 2 methyl butane diol-3,4, etc. Ethylene glycol is preferred.

The amount of the alkane diol used will be dependent in part upon the nature of the diol itself which is used. In general, the use of ethylene glycol results in obtaining a higher yield of the metal alkyl phenates than does the use of propane diol-1,2 when both are used in the same amount by weight.

Furthermore, the amount of alkane diol necessary for the preparation of the metal phenates depends to a great degree on the reactivity of the calcium and lead oxides and hydroxides with the alkane diols, and the solubilities of the phenols in the alkane diols. In the practice of this invention, it is preferred to select alkane diols in which the phenols have the greatest solubility, and in which the metal oxides and hydroxides have the greatest reactivity.

The amount of alkane diol used is sufficient to dissolve a portion of each of the reactants and to cause substantial contact between said reactants. For this purpose, it is beneficial to use certain ratios by weight of alkane diol to phenol, which ratio may have a value from about 0.2 to about 10; about 0.75 to about 2 being preferred. (When expressed in mols, the ratio of alkane diol to phenol range from 1 to 15.) Usually, it is beneficial to use the alkane diol in a mol ratio to the base substance, ranging from 2 to 50; 10 to 30 being preferred. Amounts in excess of this broad range merely serve as diluent.

Although alkane diols may become contaminated with water when left in open contact with the air, the presence of water in the alkane diol does not effect the preparation of the metal salts obtained by means of this invention. In accordance with the methods outlined hereinbelow, the water will be removed by distillation.

The amount of calcium or lead oxide or hydroxide employed in the process will vary from about that which will give a reaction product equivalent to a normal phenate (i. e., a mol ratio of metal to phenol of 1:2) up to about that equivalent to a basic phenate (i. e., a mol ratio of 1:1). Normally, about 10 mol per cent of the metal base is employed in excess of that desired in the reaction product. Thus, the metal base is present in the reaction mixture in amounts ranging from 50 to 110 mol per cent of the phenol charged.

The temperatures at which the phenols and the base substances of this invention will react most readily in the presence of an alkane vicinal diol are dependent on the nature of the phenol, the base substance and the alkane diol. It is preferred to use the minimum temperature at which the reactions will take place, in order to minimize side reactions such as decomposition and the formation of color bodies. In most instances, it is not necessary to use temperatures above about 400° F. or below about 200° F. It is preferred, however, to use temperatures in the range of 250° F. to about 350° F. In order to maintain the temperature in the range of 200° F. to 400° F., or, preferably, 250° F. to 350° F. it is necessary that the absolute pressure of the reaction vessel be substantially less than atmospheric pressure. For example, the pressure within the reaction vessel can be maintained at an absolute pressure of 10 mm. of Hg to 200 mm. of Hg when removing alkane diols. It is usually necessary to heat the reaction mixture to a temperature at which the water in the reaction mixture is driven off, either as substantially pure water or as aqueous alkane diol, thereby carrying the reaction to completion. When the alkane diol is removed with water during distillation, it is sometimes advantageous to recycle the alkane diol back to the reaction mixture or periodically to add fresh alkane diol to replace that which is distilled off. By careful fractionation, however, it is possible to distill off the water which is formed without removing the alkane diol. It is ordinarily enough for the purpose of expeditiously carrying the reaction to completion to maintain in the reaction zone alkane diol in an amount sufficient to cause substantial contact between the reactants. Other means, such as precipitation of a reaction product, can also be employed to complete the reaction.

In carrying the reaction to completion by the removal of aqueous alcohol, the viscosity of the reaction mixture may be controlled by the addition of further quantities of alkane diol, such as by recycle, or sometimes more desirably, various mineral oils and other petroleum products (e. g., kerosene, spray oil, light mineral oil, etc.) may be added instead, or concurrently, if the reaction mixture becomes too viscous. Where mineral oil concentrates of the metal salts are desired for use as lubricating oil additives or the like, it is advantageous to add mineral oil to the reaction mixture during the removal of the alkane diol, since the mineral oil serves to facilitate the removal of the alcohol and water and since the residue is suitable for immediate use as a mineral oil concentrate. Towards this purpose, a light mineral lubricating oil fraction or a spray oil or the like are suitable. Similarly, other higher boiling liquids in which the reaction product is soluble can be employed.

Numerous variations of the methods presented here may be employed in preparing the metal salts of the phenols. For example, the calcium or lead base substance may be blended with the phenol prior to being mixed with the alkane diol, or the alkane diol and the phenol may be blended together first, or all of the ingredients may be blended together at once. It is preferred, however, to mix the alkane diol and the base substance first before adding the phenol.

The calcium and lead oxides and hydroxides may be added to the reaction in any desired particle size. However, the reaction proceeds with a greater facility when the particles are of small size. The small particle size may be obtained by powdering the base substance prior to the addition to the reaction, or by thoroughly incorporating the basic substance in the alkane diol before the phenol is added.

As stated above, the process of this invention comprises broadly mixing together a basic substance, a lower alkane vicinal diol and a phenol. The resulting admixture is then heated, preferably at an absolute pressure substantially less than atmospheric, to remove water and alkane diol. When a portion of the alkane diol-water mixture has been removed, it is especially desirable that the pressure in the reaction vessel is raised to atmospheric pressure and a diluent (e. g., a mineral oil) is added, after which the pressure is again reduced and the mixture heated to about 325° F. to remove the remaining water and alkane diol.

The reaction product obtained by the present process can contain, as stated above, from 50 to 100 mol per cent, based on the phenol, of calcium or lead. Thus, the product may be equivalent to a phenate having one mol of calcium reacted with two mols of phenol, or may be a phenate having a calcium linked to a hydroxyl group and a phenoxy radical. Since the process tends to favor the latter, it is sometimes desirable to remove any unreacted phenol which may be present in the reaction product.

As a preferred embodiment of the present invention, the process may be carried out as follows: A metal base substance (e. g., lime) and a portion of the desired amount of the alkane diol (e. g., ethylene glycol) are introduced into a reaction vessel at room temperature and vigorously agitated, such as by stirring, until the base substance is thoroughly and finely dispersed in the alkane diol. A phenol is added to this reaction mixture, which is then agitated. Ordinarily, the base substance is used in an excess amount over that calculated to react with the phenol for the desired reaction product. The reactants are then stirred while heat is applied, the absolute pressure is reduced, and the reaction proceeds. Aqueous alkane diol is removed by distillation, preferably through a simple reflux condenser. Normally, the total amount of alkane diol used initially is in excess of that minimum required for dissolution of the reactants and to promote substantial contact between the reactants; this excess is employed so that sufficient alkane diol is maintained in the reaction zone to cause substantial contact between the phenol and the base substance. After a substantial amount of the aqueous alkane diol, including approximately one-half of the calculated water of reaction, is distilled over, or when the reaction mixture becomes too viscous, the vacuum on the reaction chamber is broken and a mineral oil such as a highly refined mineral oil is introduced in sufficient amount to dissolve the reaction product. Distillation under vacuum is then resumed until substantially all of the alcohol and water are removed from the reaction zone. The residue in the reaction vessel is then filtered to remove unreacted base substance. The filtrate thus obtained in a mineral oil concentrate of the desired metal phenate, which in the case of calcium hexadecyl phenate, for example, may be used as such for incorporation into a lubricating oil.

The method of this invention is particularly suitable for the preparation of calcium and lead salts of oil-soluble phenols containing up to 5, especially 1-3, straight-chain or branched-chain, saturated or unsaturated, essentially hydrocarbonaceous radicals attached to the benzene ring, each radical preferably having from 4 to 30 carbon atoms. Examples of suitable hydrocarbonaceous radicals include alkyl radicals such as butyl, hexyl, octyl, decyl, dodecyl, hexadecyl, eicosyl, triacontyl radicals; radicals derived from petroleum hydrocarbons such as white oil, wax, olefin polymers (e. g., polypropylene and polybutene), etc; cyclic non-benzenoid radicals, such as cyclohexyl, bornyl, etc; alkoxy radicals such as pentoxy, octoxy and cetoxy radicals, etc.

Examples of phenols include: butyl phenol, amyl phenol, hexyl phenol, octyl phenol, decyl phenol, dodecyl phenol, tetradecyl phenol, octadecyl phenol, hexadecyl phenol, dibutyl phenol, di-octyl phenol, dihexadecyl phenol, di-octadecyl phenol, tributyl phenol, tri-octadecyl phenol, eicosyl phenol, triacontyl phenol, alkyl phenols wherein the alkyl groups are derived from alkylene polymers, pentoxy phenol, octoxy phenol, meta-, ortho- and para-cetoxy phenols, etc. Likewise, phenol sulfides such as di-alkylphenol sulfides, e. g., diamylphenol sulfide, or mixtures thereof with alkyl phenols, can also be employed.

The following examples illustrate the method of preparing calcium and lead phenates according to the process of this invention. Example 1 illustrates the preparation of an alkyl phenol. In this particular example, a "cetyl" phenol was prepared; the "cetyl" here referring to the alkyl group resulting from the propylene polymers, each alkyl group containing an average of 14 carbon atoms. Thus, the term "cetyl" of the subsequent examples refers to an alkyl group containing an average of 14 carbon atoms. Examples 2-5, inclusive, illustrate the attempted preparation of metal phenates without the use of an alkane diol reaction medium. The percentage of metal, i. e., calcium or lead, combined with the phenol, is compared in the following examples with the theoretical percentage of the calcium or lead present in the normal phenate which is employed as a standard of comparison for conversions of calcium or lead base to the salts, whether normal or basic phenates. In many of the examples, the metal phenates are in mineral oil solution. In calculating the "theoretical" percentages, this dilution by the mineral oil was taken into consideration. Thus, where mineral oil was used as a diluent, the theoretical percentages refer to the metal present in the normal phenate in mineral oil.

*Example 1.—Preparation of an alkyl phenol*

A mixture consisting of 600 parts by weight of a phenol, 1200 parts by weight of propylene polymers, and 160 parts by weight of acid treated clay was heated at 300° F. for a period of six hours, after which time the mixture was filtered. The filtrate was heated to 360° F. at an absolute pressure of 50 mm. of mercury to remove unreacted phenol, olefin polymers and low molecular weight alkyl phenols. The alkyl phenol thus prepared had a hydroxyl number of 165.

*Example 2.—Attempted preparation of a lead alkyl phenate without the use of a solvent*

350 grams of an alkyl phenol (hydroxyl number of 159) was heated to 150° F., after which 112.5 grams of lead oxide and 350 grams of a California solvent refined paraffin base oil having a viscosity of 480 SSU at 100° F. were slowly added and the temperature increased to 330° F., at the same time reducing the pressure to an absolute pressure of 20 mm. of mercury. Practically no water of reaction was obtained in the distillation, and most of the lead remained undissolved. There was no evidence of reaction.

*Example 3.—Preparation of a lead alkyl phenate using ethyl alcohol as a solvent*

A mixture of 350 grams of an alkyl phenol (hydroxyl number of 159) and 350 grams of ethyl alcohol was heated to 120° F., after which 112.5 grams of lead oxide was added, and the temperature increased to 150° F. The mixture was stirred at this temperature for 30 minutes. The temperature was then slowly raised to 330° F. and the pressure was reduced to an absolute pressure of 20 mm. of mercury to remove ethyl alcohol. The reaction mixture was filtered and the filtered reaction product contained 5.28% lead (theoretical is 22.8%). On the basis of 22.8% theoretical for the normal phenate, the conversion was only 23.2%.

*Example 4.—Attempted preparation of a calcium alkyl phenate using ethyl alcohol as a solvent*

A mixture of 162 grams of an alkyl phenol having a hydroxyl number of 173, 14 grams of calcium oxide and 162 grams of 200 proof ethyl alcohol was heated at reflux temperature, with constant agitation, for one hour. Approximately 50% of the ethyl alcohol was removed by distillation; after which, 162 grams of a California solvent-refined paraffin base oil was added. The remainder of the ethyl alcohol was removed by distillation at a temperature of 350° F. at an absolute pressure of 10 mm. of Hg. After filtration, the reaction mixture contained 0.0% calcium.

*Example 5.—Attempted preparation of a calcium alkyl phenol using n-octanol as a solvent*

A mixture of 162 grams of an alkyl phenol having an hydroxyl number of 173, 14 grams of calcium oxide, and 162 grams of n-octanol was heated at 300° F. with constant agitation for one hour. Approximately 50% of the alcohol was removed by distillation at an absolute pressure of 150 mm. of Hg; after which, 162 grams of a California solvent-refined paraffin base oil was added. The remainder of the octyl alcohol was then removed by distillation at a temperature of 375° F. and an absolute pressure of 10 mm. of Hg. The reaction mixture was filtered hot. Chemical analysis showed 0.00% calcium for the filtered reaction mixture.

In the remaining examples hereinbelow, alkane vicinal diols were used as the reaction media.

*Example 6.—Preparation of lead alkyl phenate*

A mixture of 350 grams of an alkyl phenol (hydroxyl number of 165) and 350 grams of ethylene glycol was heated to 150° F., after which 110 grams of lead oxide was added and the temperature slowly raised to 330° F. while reducing the pressure to an absolute pressure of 20 mm. of mercury. The temperature was maintained at 330° F. and at an absolute pressure of 20 mm. of mercury until the reaction product was substantially free of ethylene glycol. An attempt was made to filter the residue through celite; however, due to the viscosity of the reaction mixture, only a small portion of the reaction product was filtered before the filter became clogged. The filtered material contained 28.4% lead (theoretical is 23.4%).

*Example 7.—Preparation of lead alkyl phenate*

A mixture of 350 grams of ethylene glycol and 350 grams of an alkyl phenol having a hydroxyl number of 159 was charged to a distillation flask and heated to 120° F. with continued stirring, after which 112.5 grams of lead oxide was slowly added and the contents heated to 250° F. and stirred for an additional 30 minutes. The absolute pressure was reduced to 20 mm. of mercury and the temperature was increased to 330° F. After 260 grams of ethylene glycol had been removed by distillation, the pressure was increased to atmospheric pressure and the temperature reduced, and 350 grams of a California solvent refined paraffin base oil having a viscosity of 480 SSU at 100° F. was added. The absolute pressure was again reduced to that of 20 mm. of mercury and the temperature maintained at 330° F. until no further ethylene glycol was being removed. The reaction mixture was then cooled to 280° F.; and at atmospheric pressure 200 mm. of xylene was added to assist in stripping off residual glycol. The pressure was again reduced to 20 mm. of mercury, and the reaction mixture was heated at 300° F. until the residual ethylene glycol had been removed, after which the reaction mixture was filtered at temperatures ranging from 250°–300° F. The reaction product contained 13.55% lead (theoretical is 12.8%).

*Example 8.—Preparation of lead alkyl phenate*

A mixture of 350 grams of ethylene glycol and 350 grams of an alkyl phenol having a hydroxyl number of 159 was charged to a reaction vessel and heated to 120° F. with continuous stirring, after which 112.5 grams of lead oxide was slowly added and the contents heated to 250° F. and stirred for an additional 30 minutes. The absolute pressure was reduced to 20 mm. of mercury and the temperature was increased to 330° F. After 260 grams of ethylene glycol had been removed by distillation, the pressure was increased to atmospheric pressure, and the temperature was reduced. 350 grams of a California solvent-refined paraffin base oil having a viscosity of 480 SSU at 100° F. was then added. The pressure was again reduced to 20 mm. of mercury, and the temperature maintained at 300° F. until no more ethylene glycol was removed by distillation. The reaction mixture was then cooled to 280° F., and at atmospheric pressure, 200 mm. of xylene was added to assist in stripping off further amounts of ethylene glycol. The pressure was again reduced to 20 mm. of mercury, and the reaction mixture was heated to 330° F. until ethylene glycol could no longer be removed. After the action mixture had been filtered (at temperatures ranging from 250–300° F.), the reaction product contained 13.1% lead (theoretical is 12.8%).

*Example 9.—Preparation of lead alkyl phenate*

A mixture of 350 grams of ethylene glycol and 350 grams of a polypropylene phenol having a hydroxyl number of 165 was heated to 100° F. with constant agitation; after which, 100 grams of lead oxide was slowly added, and the reaction mixture was heated at 150° F. for an additional 30 minutes. The temperature was increase to 330° F., and the pressure was reduced to an absolute pressure of 20 mm. of mercury to remove the greater portion of ethylene glycol by distillation. 350 grams of California solvent-refined paraffin base oil having a viscosity of 480 SSU at 100° F. was added and the reaction mixture was further heated at 330° F. at an absolute pressure of 20 mm. of mercury. The reaction mixture was cooled to 280° F. at atmospheric pressure and 200 mm. of xylene was added. The reaction mixture was distilled at a temperature of 330° F. at an absolute pressure of 20 mm. of mercury until the xylene and no further amount of ethylene glycol could be removed; after which the reaction mixture was filtered hot. The reaction product contained 12.70% lead (theoretical is 13.1%).

*Example 10.—Preparation of calcium "cetyl" phenate*

200 grams of "cetyl" phenol (equivalent weight of about 313), 18.5 grams of calcium oxide, and 200 grams of ethylene glycol were introduced into a reaction flask at room temperature; and the mixture was heated to 300° F., with constant agitation. The pressure within the flask was reduced to an absolute pressure of 15 mm. of mercury and the reaction mixture was heated to remove ethylene glycol by distillation. When 100 mm. of aqueous ethylene glycol had been distilled from the reaction mixture, 200 grams of mineral oil was added at atmospheric pressure. The absolute pressure in the reaction vessel was again reduced to 15 mm. of mercury, and the distillation was continued until the temperature of the mixture in the flask had reached 350° F. at 15 mm. of mercury. The reaction product was then filtered at a temperature of 250° F.; the filtered product containing 2.65% calcium (theoretical is 3.1%).

*Example 11.—Preparation of sulfurized calcium "cetyl" phenate*

24 grams of calcium oxide was added to 280 mm. of propylene glycol, and to this mixture was added 280 grams of "cetyl" phenol (equivalent weight of 313). The resulting mixture was slowly heated at an absolute pressure of 15 mm. of Hg to distill off water and propylene glycol. When 210 ml. of the water-propylene glycol mixture had been distilled off, the pressure in the reaction vessel was raised to atmospheric pressure and 280 grams of a mineral oil added. The pressure was again reduced to 15 mm. of Hg and the mixture was slowly heated to 325° F. to assure removal of all of the water and propylene glycol. This reaction product was treated with 12.3 grams of sulfur at 325° F. at atmospheric pressure for 2 hours. The resulting reaction product contained 0.67% calcium (theoretical is 2.9%) and 0.85% sulfur.

*Example 12.—Preparation of sulfurized calcium "cetyl" phenate*

280 grams of "cetyl" phenol (equivalent weight of about 320), 280 ml. of ethylene glycol and 33 grams of commercial calcium hydroxide were stirred together for about 30 minutes at 100° F. The pressure was reduced to 15 mm. of Hg and the mixture heated slowly until 210 ml. of aqueous ethylene glycol had been distilled off. After the pressure had been raised to atmospheric, 280 grams of a mineral oil was added. The pressure was then reduced to 15 mm. of Hg and after the mixture had been heated slowly to 325° F. to remove the remaining aqueous ethylene glycol, 12.3 grams of powdered sulfur was added. After heating at 325° F. at atmospheric pressure for 1 hour, the reaction mixture was filtered. The filtrate contained 2.98% calcium (theoretical is 3%), and 1.76% sulfur.

*Example 13.—Preparation of calcium-p-tertiary-amyl phenate*

A mixture of 143 grams of p-tertiary-amyl phenol, 280 ml. of ethylene glycol and 25 grams of calcium oxide was stirred at 150° F. for 30 minutes. At this point, the mixture was very viscous, so an additional 280 ml. of ethylene glycol was added. After reducing the pressure to 15 mm. of Hg, the mixture was slowly heated with continued reaction until 200 ml. of aqueous ethylene glycol had been distilled off. A 280-gram portion of a mineral oil was then added. The pressure was again reduced to 15 mm. of Hg and the mixture was heated until an additional 140 ml. of ethylene glycol had been distilled over. After addition of 280 grams of a mineral oil, the balance of the water and ethylene glycol was removed by heating to 325° F. at a pressure of 15 mm. of Hg. The reaction mixture was diluted with benzene, filtered at 120° F., and heated to distill off the benzene. The remaining reaction product contained 0.62% calcium (theoretical is 2.6%).

*Example 14.—Preparation of sulfurized calcium "cetyl" phenate*

38 pounds of "cetyl" phenol (equivalent weight of about 313), 33 pounds of ethylene glycol and 4.5 pounds of calcium oxide were thoroughly mixed by stirring together in a reaction vessel at room temperature for about 10 minutes. The pressure in the reaction vessel was reduced to 15 mm. of Hg and the reaction mixture was slowly heated. At the end of 0.5 hour, the temperature of the reaction mixture was 255° F., and at this time, aqueous ethylene glycol began to distill off of the reaction mixture. At the end of 1.75 hours the temperature was 270° F. and about 24 pounds of aqueous ethylene glycol had been distilled off. The pressure in the reaction vessel was raised to atmospheric pressure, and 36.7 pounds of a mineral oil was added to the reaction mixture. After reducing the pressure again to 15 mm. of Hg, the temperature was slowly raised. Aqueous ethylene glycol continued to distill off, and at the end of 3.75 hours, the temperature had reached 304° F., when the distillation ceased. The calcium "cetyl" phenate product was then reacted with 1.34 pounds of sulfur at 315° F. for 3.4 hours, and after the reaction product had been filtered, it contained 2.84% calcium (theoretical is 2.3%) and 0.96% sulfur.

*Example 15.—Preparation of sulfurized calcium "cetyl" phenate*

After 30 pounds of ethylene glycol had been pumped into a reaction vessel, a mixture consisting of 4.5 pounds of lime, thoroughly and finely dispersed by previous agitation in 14 pounds of ethylene glycol, was pumped in and thoroughly mixed with the original ethylene glycol charge at room temperature. Then 38 pounds of "cetyl" phenol (equivalent weight of about 313) was added, and the mixture was stirred at room temperature for about 10 minutes. After reducing the pressure to 15 mm. of Hg, the mixture was slowly heated until at the end of 0.5 hour the temperature had reached 245° F. and aqueous ethylene glycol began to distill from the mixture. At the end of 2 hours, the temperature was 260° F., and 37.5 pounds of aqueous ethylene glycol had distilled off from the mixture. The pressure was raised to atmospheric pressure and 36.7 pounds of a mineral oil was added to the reaction mixture. The pressure was again reduced to 15 mm. of Hg. At the end of 5 hours the temperature was 310° F. and the distillation had ceased. The pressure was raised to atmospheric, and the reaction mixture was reacted with 1.35 pounds of sulfur at 305° F. for 3 hours, and the product filtered. The final product contained 2.69% calcium (theoretical about 2.3%) and 0.86% sulfur.

*Example 16.—Preparation of sulfurized calcium "cetyl" phenate*

After 22 pounds of ethylene glycol and 2.25 pounds of calcium oxide had been thoroughly mixed together and pumped into a reaction vessel at room temperature, 19 pounds of "cetyl" phenol (equivalent weight of about 313) was added to the mixture. After reducing the pressure to 15 mm. of Hg at room temperature, the reaction mixture was heated until at the end of 0.2 hour the temperature was 205° F. and aqueous ethylene glycol began to distill from the reaction vessel. After 17.8 pounds of aqueous ethylene glycol had been distilled from the mixture, the pressure was raised to atmospheric, and 18.4 pounds of a mineral oil was added. The pressure was again reduced to 15 mm. of Hg and the distillation continued. At the end of 5.1 hours, the temperature of the reaction mixture was 320° F., and the distillation of the aqueous ethylene glycol had ceased. After raising the pressure to atmospheric, the reaction mixture was treated with 0.67 pound of sulfur at 300° F. for 2 hours. The mixture was filtered, and the resulting product contained 2.28% calcium (theoretical is 3.4%) and 0.83% sulfur.

I claim:

1. A method of preparing calcium and lead salts of phenols which comprises reacting a phenol with a metal base selected from the group consisting of calcium and lead basic-reacting substances in a reaction medium consisting essentially of a dihydric alcohol containing up to 6 carbon atoms.

2. A method of preparing calcium and lead salts of phenols which comprises reacting a phenol with a metal base selected from the group consisting of the oxides and hydroxides of calcium and lead in a reaction medium consisting essentially of an alkane vicinal diol having less than 6 carbon atoms.

3. A process of preparing calcium and lead salts of phenols which comprises reacting a phenol with a metal base selected from the group consisting of the oxides and hydroxides of calcium and lead in a reaction medium consisting essentially of an alkane vicinal diol having less than 6 carbon atoms, wherein the ratio by weight of said alkane vicinal diol to said phenol is from about 0.2 to about 10.

4. A process of preparing calcium and lead salts of phenols which comprises reacting a phenol with a metal base selected from the group consisting of the oxides and hydroxides of calcium and lead in a reaction medium consisting essentially of an alkane vicinal diol having less than 6 carbon atoms, wherein said alkane vicinal diol and said metal base are present in a ratio, by weight, of 2 to 50.

5. A process of preparing calcium and lead metal salts of phenols having in the salts one mol of phenol for each metal ion, which comprises forming an admixture of a metal base selected from the group consisting of the oxides and hydroxides of calcium and lead, an alkane vicinal diol containing less than 6 carbon atoms, and a phenol, and heating said admixture to remove substantially all of said alkane diol.

6. A method of preparing a calcium salt of a phenol which comprises reacting a phenol with a calcium basic-reacting substance in a reaction medium consisting essentially of a dihydric alcohol having less than 6 carbon atoms.

7. The process of claim 6, wherein the dihydric alcohol is ethylene glycol.

8. A process of preparing a calcium salt of a phenol wherein a phenol is reacted with a calcium oxide in a dihydric alcohol reaction medium, said dihydric alcohol having less than 6 carbon atoms.

9. A process of preparing a calcium salt of a phenol by treating a phenol with a calcium hydroxide in a dihydric alcohol reaction medium, said dihydric alcohol having less than 6 carbon atoms.

10. A process of preparing a calcium salt of a phenol which comprises treating a phenol with a calcium base substance in the presence of a dihydric alcohol wherein the ratio by weight of the dihydric alcohol to the phenol is from about 0.2 to about 10.0, said dihydric alcohol having less than 6 carbon atoms.

11. A process of preparing a calcium salt of a phenol which comprises treating a phenol with a calcium oxide in the presence of a dihydric alcohol, wherein the ratio by weight of the dihydric alcohol to the phenol is from about 0.75 to about 2.0, said dihydric alcohol having less than 6 carbon atoms.

12. A process of preparing a calcium salt of a phenol which comprises treating a phenol with a calcium hydroxide in the presence of a dihydric alcohol, wherein the ratio by weight of the dihydric alcohol to the phenol is from about 0.75 to about 2.0, said dihydric alcohol having less than 6 carbon atoms.

13. A method of reacting a phenol with a calcium base substance to form a calcium salt of said phenol, which comprises contacting in a reaction zone a phenol with a calcium base substance in the presence of a dihydric alcohol having less than 6 carbon atoms, removing from the reaction zone the water of reaction, and maintaining in the reaction zone a sufficient amount of dihydric alcohol to cause substantial contact between said phenol and base substance.

14. A method of reacting an alkyl phenol with a calcium base substance to form a calcium salt of said phenol, which comprises contacting in a reaction zone a phenol with a calcium base substance in the presence of a dihydric alcohol having less than 6 carbon atoms, removing from the reaction zone aqueous dihydric alcohol, and maintaining in the reaction zone a sufficient amount of dihydric alcohol to cause substantial contact between said phenol and base substance, said alkyl phenol containing from 2 to 16 carbon atoms in the alkyl group.

15. A method of preparing a calcium salt of a phenol which comprises first dispersing a calcium base substance in dihydric alcohol having less than 6 carbon atoms and thereafter contacting and reacting the base substance in said dispersion with a phenol to produce said calcium salt.

16. A method of reacting an alkyl phenol with a calcium base substance selected from the group consisting of calcium oxide and calcium hydroxide to form a calcium salt of said alkyl phenol, which comprises contacting in a reaction zone an alkyl phenol with a calcium base substance in the presence of a dihydric alcohol having less than 6 carbon atoms, removing from the reaction zone the water of reaction, and maintaining in the reaction zone a sufficient amount of dihydric alcohol to cause substantial contact between said phenol and base substance, wherein the ratio, by weight, of said dihydric alcohol and phenol has a value from about 0.2 to about 10.0.

17. The process of claim 16 wherein the alkyl phenol is a mixture of alkyl phenols wherein the number of carbon atoms in the side chains range from 14 to 16, and the equivalent weights range from 312 to 320.

18. A method of preparing a lead salt of an alkyl phenol which comprises reacting an alkyl phenol with a base selected from the group consisting of lead oxide and lead hydroxide in a reaction medium consisting essentially of an ethylene glycol.

19. A process of preparing a lead salt of an alkyl phenol which comprises reacting an alkyl phenol with a base selected from the group consisting of lead oxide and lead hydroxide in an ethylene glycol reaction medium, wherein the ratio, by weight, of the ethylene glycol to the alkyl phenol is from about 0.5 to about 10.

20. A process of preparing a lead salt of an alkyl phenol which comprises reacting an alkyl phenol with a base selected from the group consisting of lead oxide and lead hydroxide in an ethylene glycol reaction medium, wherein the ratio, by weight, of the ethylene glycol to the alkyl phenol is from about 1 to about 2.

21. A method of preparing a lead salt of an alkyl phenol which comprises reacting an alkyl phenol with a base selected from the group consisting of lead oxide and lead hydroxide in a reaction medium consisting essentially of an alkane diol having no more than three carbon atoms.

22. A method of preparing a lead salt of an alkyl phenol wherein an alkyl phenol is reacted with a base selected from the group consisting of lead oxide and lead hydroxide in a reaction zone in the presence of an ethylene glycol, removing from the reaction zone the water of reaction, and maintaining in the reaction zone a sufficient amount of ethylene glycol to cause substantial contact between said alkyl phenol and base.

23. A method of preparing an oil-soluble lead alkyl phenate comprising reacting an alkyl phenol with a base selected from the group consisting of lead oxide and lead hydroxide in ethylene glycol reaction medium, removing a major portion of the ethylene glycol from the reaction zone, adding a mineral oil, removing the balance of the ethylene glycol from the reaction zone, and filtering the reaction mixture.

24. A method of preparing an oil-soluble lead alkyl phenate comprising forming a mixture of ethylene glycol and a base selected from the group consisting of lead oxide and lead hydroxide, adding, with stirring, an alkyl phenol, heating the reaction mixture under reduced pressures to remove a major portion of the ethylene glycol, adding a mineral oil, heating at reduced pressure to remove the balance of the dihydric alcohol, filtering the reaction mixture, and recovering a mineral oil concentrate of oil-soluble lead alkyl phenate.

25. A method of preparing an oil-soluble lead alkyl phenate comprising forming a mixture of propylene glycol and a base selected from the group consisting of lead oxide and lead hydroxide, adding, with stirring, an alkyl phenol, heating the reaction mixture under reduced pressures to remove a major portion of the ethylene glycol, adding a mineral oil, heating at reduced pressure to remove the balance of the ethylene glycol, filtering the reaction mixture, and recovering a mineral oil concentrate of oil-soluble lead alkyl phenate.

References Cited in the file of this patent

UNITED STATES PATENTS

| Number | Name | Date |
| --- | --- | --- |
| 1,955,080 | Mills | Apr. 17, 1934 |
| 2,228,661 | Gardiner et al. | Jan. 14, 1941 |
| 2,252,663 | Reiff | Aug. 12, 1941 |
| 2,331,448 | Winning et al. | Oct. 12, 1943 |
| 2,340,938 | Daly | Feb. 8, 1944 |
| 2,402,448 | Richards | June 18, 1946 |
| 2,409,687 | Rogers et al. | Oct. 22, 1946 |
| 2,449,026 | Van Gilder | Sept. 7, 1948 |

FOREIGN PATENTS

| Number | Country | Date |
| --- | --- | --- |
| 823,468 | France | Oct. 18, 1937 |